F. WACKENHUTH.
METALLIC PISTON PACKING.
APPLICATION FILED JUNE 4, 1918.

1,279,948.

Patented Sept. 24, 1918.

Witness
Floyd R. Cornwall.
L. L. Burket.

Inventor
Frederick Wackenhuth,
By A. S. Pattison,
Attorney

UNITED STATES PATENT OFFICE.

FREDERICK WACKENHUTH, OF NEWARK, NEW JERSEY, ASSIGNOR TO STEWART S. KURTZ, SR., OF CANTON, OHIO.

METALLIC PISTON-PACKING.

1,279,948.  Specification of Letters Patent.  Patented Sept. 24, 1918.

Original application filed September 30, 1915, Serial No. 53,401. Divided and this application filed June 4, 1918. Serial No. 238,119.

*To all whom it may concern:*

Be it known that I, FREDERICK WACKENHUTH, a citizen of the United States, residing at Newark, in the county of Essex and State of New Jersey, have invented certain new and useful Improvements in Metallic Piston-Packings, of which the following is a specification, reference being had therein to the accompanying drawing.

My invention relates to improvements in metallic piston packings, and while designed and intended more particularly for use in internal combustion engines, it is adapted to be used in all places where an efficient metallic piston packing is desirable.

The object of my invention is to provide a three-piece metallic piston ring, so constructed and so arranged that an improved packing effect is accomplished.

The present invention relates to that class of metallic piston rings, which are made up of an inner open eccentric ring, and two open outer eccentric rings embracing the inner ring, and of a combined width equal to the width of the inner ring.

The present invention may be characterized as comprising one inner eccentric spring expanding ring and two outer independent eccentric expansible rings, the inner ring having an opening in its thin side, and the outer rings having openings in their thin sides, the outer rings arranged on the inner ring with their thin sides at the thick side of the inner ring, and their openings out of communication.

By this construction and relative arrangement of the three piece ring, the tapering independent flexible ends of the outer rings cause them to tightly conform to the outer engaging surface of the inner ring and to the cylinder wall in which the packing is used, and the relative arrangement of the thick and thin portions of the three rings causes them to conform to each other and to the cylinder wall, which provides a highly improved fit between the inner and outer rings, and between the outer rings and the cylinder wall.

In the accompanying drawings—

Figure 1:
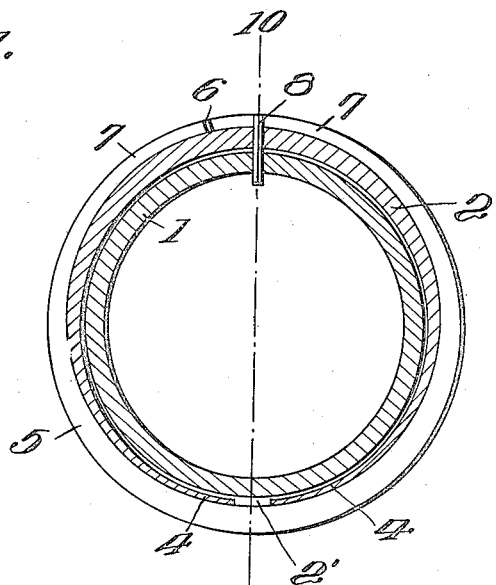
Fig. 1 is a horizontal sectional view on the line 2—2 of Fig. 2.

Referring now to the drawings, 1 represents a portion of the piston body, which is provided with one or more annular grooves (not shown) to receive a piston packing or packings, as is well understood by those skilled in this art.

In carrying out my present improvement, I provide an inner eccentric spring expanding ring 2, which has an opening 2', in its thin portion, thus forming two tapering spring expanding ends 4.

Figure 2:
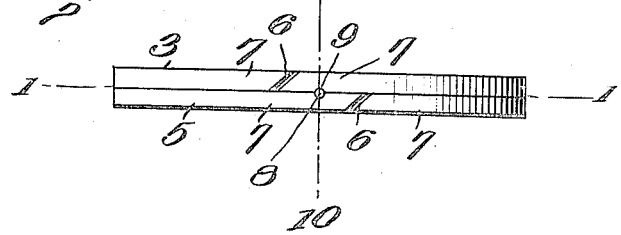
Fig. 2 is an edge view.
Figure 3:
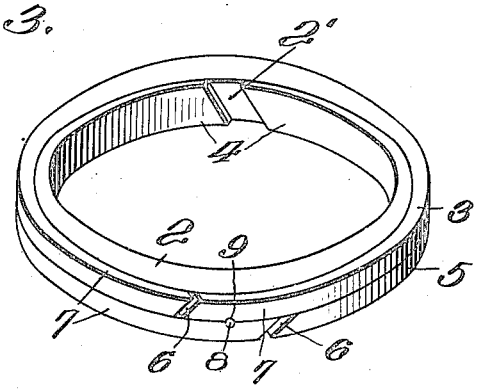
Fig. 3 is a perspective view of my improved ring.

Surrounding and embracing this inner eccentric ring 2, are two outer eccentric rings 3 and 5, each of which is provided with an opening 6 in its thin portion, which form two flexible tapering ends 7 for each outer eccentric ring. These outer rings 3 and 5 are of a combined width equal to a width of the single inner ring 2, as shown, and they are placed edge to edge, as shown in Fig. 2, with their adjacent edges in engagement.

Attention is directed to the fact, that the inner and outer rings are assembled so that the thin portions of the outer rings are at the thick portion of the inner ring, and the openings 6 of the outer rings are out of line. The three rings are held in the assembled relative positions just described when in working positions by means of a pin 8, and the primary function of the pin is to hold the three rings in the described relative positions. As here shown, the pin 8 passes into the piston body 1, but it is not necessary to lock the rings to the piston, as will be readily understood by those skilled in the art, and the pin 8 need not therefore extend into the piston body 1, in order to carry out my improvement.

Attention is also directed to the fact, that the pin 8, and the grooves or openings 9 in the outer rings 3 and 5, are located on an imaginary line 10 crossing the exact center of the rings, whereby the two rings 3 and 5 are duplicates. That is to say, by this arrangement either ring may be used in the position of the other, and this is quite an advantage in manufacture, in that only one form of outer ring is made, for it is adapted to be used in both positions on the inner ring, thus making up from a single form of the inner ring, and a single form of outer ring, the three piece ring arranged as here shown and for the purpose described—a three ring structure made from two forms of rings.

Also by the described construction and arrangement of outer rings, one of the thin ends of each ring overlaps and closes the opening of the outer ring, whereby an improved closure is provided at the expansion space zone of the outer ring.

The inner ring is spring expanding, and by arranging the inner and outer eccentric rings in the relative positions here shown and described, the tapered ends of the outer rings tightly conform to the outer engaging surface of the inner ring and the inner cylinder wall, whereby an improved packing against the escape of pressure is accomplished.

It will be understood of course that the relative thicknesses of the inner and outer rings may vary from that shown without departing from the scope of my invention, so long as they maintain the construction and relative arrangement hereinafter pointed out in the claims.

Having thus described my invention, what I claim and desire to secure by Letters Patent is—

1. In a metallic expansible piston packing, the combination of an inner eccentric spring ring having an opening in its thin side, and of a diameter smaller than the inner diameter of the cylinder in which it is used, an outer eccentric spring ring having an opening in its thin side and at a predetermined side of an imaginary line radially crossing the exact center of the thicker and thinner sides, a duplicate of said outer ring and both mounted side by side on said inner ring so that said imaginary line of each and the thicker and thinner sides match so that the said openings do not come one opposite the other, whereby their ends overlap, and so that the thicker sides of both are at the thinner side of said inner ring, whereby the outer rings conform to the inner ring and to the cylinder wall, and the pair of outer rings when side by side are equal in width to that of said inner ring, and means for holding said rings from relatively rotating, and in concentric form.

2. In a metallic expansion piston packing, the combination of an inner eccentric spring expanding ring open in its thin side, two outer eccentric expansible rings having openings in their thin sides but out of communication and mounted on said inner ring side by side with the thick side of the inner ring at the thin open sides of the outer rings and the opening of the inner ring at the thick sides of the outer rings and means for locking the three rings in their said positions, thus providing two independent cylinder bearing rings having their ends gradually tapering into the thick portion thereof, whereby there is independent flexibility of the outer rings and their outer surfaces are caused to conform to the cylinder wall and their inner surfaces caused to conform to the inner ring, thus making an improved closure between the outer surfaces of the outer rings and cylinder, and an improved closure of the expansion space zone of the outer rings.

In testimony whereof I hereunto affix my signature in the presence of two witnesses.

FREDERICK WACKENHUTH.

Witnesses:
W. L. MORGAN,
WALTER DELBITT.